3,078,168
ANGEL FOOD CAKE MIXES

William T. Bedenk, Greenhills, Ohio, assignor to The Procter & Gamble Company, Cincinnati, Ohio, a corporation of Ohio
No Drawing. Filed Jan. 25, 1960, Ser. No. 4,230
9 Claims. (Cl. 99—94)

This invention relates to prepared angel food cake mixes. More particularly, it relates to dry prepared mixes which can be used to prepare batters suitable for baking into angel food cakes which have a substantial increase in size as compared to cakes which are prepared from prior art mixes.

Angel food cake batters are conventionally prepared by beating egg whites until they foam. Salt, cream of tartar, flavoring, and sugar are added, and the beating is continued until the mixture forms stiff peaks. A mixture of flour and sugar is then gently folded in by hand-mixing, and the resulting batter is placed in a pan and baked.

Most dry prepared angel food cake mixes combine dried egg whites, sugar, phosphate or tartrate salts, and flavoring in one package, and additional sugar, farinaceous material, salt, leavening, and flavoring in a second package. To prepare a batter from this type of mix, water is mixed with the contents of the first packet, and the mixture is beaten. The contents of the second packet are then gently folded into the mixture as is done in conventional angel food cake preparation.

Although these mixes relieve the housewife of the necessity of measuring ingredients, the time-consuming, double-processing steps of beating and subsequent hand-folding of ingredients are still required.

Angel food cake mixes have been made in which the entire mixing operation can be performed by an electric mixer, thereby obviating the hand-folding step. Such a mixing procedure is made possible by lowering the lipid content of the farinaceous material in the mix below the level used for a hand-fold mix. This can be done by special treatment of the flour to reduce the lipid level, as by solvent extraction, or by substituting starch in place of a part of the flour. However, if too little protein is present, the cakes become too tender and will fall out of the pan when being cooled in the usual inverted position. In some special formulations, all of the mix ingredients are combined in one package and the mixing operation can be done as a single step. It has been found, however, that such a mixing operation will result in a reduction in the size of the cakes.

It has not been considered desirable to have fat present in angel food cake batters since it was considered to have an adverse effect on egg white foam.

It has now been found that the addition to angel food cake mixes of certain normally solid fats in small particle sizes will increase the volume of angel food cakes prepared from mixes, and will also reduce the tendency toward developing depressions on the underside of the cake during baking.

Accordingly, it is an object of this invention to provide a dry prepared angel food cake mix which can be easily mixed, but which also can be used to make cakes which have a size and structure comparable to that of conventional non-mix cakes.

It is a further object to provide a means for improving prior-art dry prepared angel food cake mixes.

Other objects and advantageous features will be apparent from the following detailed description.

In general, mixes of this invention comprise egg white, sugar, farinaceous material and particles of finely divided, normally solid triglyceride fat. The mixes should contain at least 0.05%, by weight, of fat particles having a size not greater than about 150 microns. Additional fat can be present in the form of larger particles, but the total amount of glyceride fat in the mix should not exceed 5.0%, by weight. For optimum eating qualities, substantially none of the fat particles should have a dimension greater than about 0.015 inch. It is to be understood that the fat particles will be irregular in shape and that a particle size of 150 microns defines a particle which will pass through a 100-mesh standard sieve.

Triglyceride fat particles suitable for use in mixes of this invention can be made by hydrogenating triglyceride oils such as cottonseed oil, peanut oil, soybean oil, and rapeseed oil, until they are normally solid at room temperature and have a melting point of not less than about 125° F. Other suitable triglycerides include those made by combining glycerine and saturated fatty acids to form triglycerides having melting points not less than about 125° F.

The normally solid fat can be conveniently reduced to small particle size by means of an impact grinder such as a hammermill, and it may be desirable to keep the fat cool during the grinding operation to avoid agglomeration of the particles. Addition of Dry Ice to the fat during grinding is a satisfactory means of cooling.

Another satisfactory method of achieving the desired reduction in particle size is to mix normally solid fat with sugar in proportions ranging from about 2 to 20 parts per part of fat, and then to subject the mixture to impact grinding. A suitable apparatus for the impact grinding is disclosed in U.S. Patent 2,339,737, issued January 18, 1944. This device comprises two parallel horizontal discs spaced apart by interconnecting pins extending at right angles to the surfaces of the discs. An external shell encloses the discs. Material to be treated is passed through a hole in the center of the top disc while the discs are revolving at a high rate of speed. Centrifugal force impacts the material against the pins and the external shell, thereby breaking up any large particles or agglomerates present. The broken up material passes out through an outlet at the bottom of the device. When fat and sugar are treated in this manner, the fat particles may be bonded to the sugar.

The present invention can be conveniently described in detail in connection with so-called "two-stage" mixes. In general, components of these mixes are well-known in the art. Suitable mixes of this type comprise an "A" package, containing sugar, dried egg white, salt, flavoring, egg whipping aids, and foam stabilizers, and a "B" package containing sugar, farinaceous material, flavoring, and chemical leavening and salt if desired.

The sugar is preferably finely divided. Excellent results can be obtained with sucrose, although other finely divided sugars can be used. Sugar tends to retard coagulation of the egg white and thus adds tenderness to the cake as well as sweetening it. However, too large a proportion of sugar will result in a cake that is so tender it will fall. The sugar can be proportioned between the "A" and "B" packages, and from about 10% to 90% of the total sugar can be present in the "A" package. It may also be desirable to have dextrose or some other invert sugar present as part of the sugar to promote browning of the cake. The mix can comprise about 50% to 70% total sugar, by weight.

The egg whites form the foam which entraps air during the initial beating step and provides volume in the cake. Too small an amount of egg white will cause the cake to be too small and too tender, although too large an amount of egg white will result in a cake which is tough in eating quality. Suitable amounts of dried egg whites in the "A" package range from 6% to 15%, by weight of mix.

Various whipping aids and foam stabilizers can either be added to the egg whites prior to drying, or mixed with other dry ingredients of the "A" package. These include, but are not limited to, cream of tartar, tartaric acid, monosodium phosphate, sodium hexametaphosphate, monocalcium phosphate, ox bile extract, taurocholic acid, triethyl citrate, triacetin, cholic acid, desoxycholic acid, glycocholic acid, and edible soluble salts of the acids. Suitable amounts of these materials can range from about 0.01% to 2.0%, by weight of mix.

Salt can be added to either the "A" or the "B" package. The mix suitably contains from about 0.2% to 1.0% salt, by weight of the mix.

Minor amounts of flavors can be added, such as vanilla, artificial butter flavor, lemon, cherry, and almond. Flavors containing oils are undesirable in the "A" package since they tend to depress foam formation, and preferably should be present in the "B" package.

The farinaceous material in the "B" package preferably comprises a mixture of soft wheat cake flour and wheat starch. However, other flours and starches can be used, although some adjustment in the proportions of ingredients may be necessary for optimum cake performance. In general, a mix containing only conventional flour as the farinaceous material will produce cakes which are small in size and somewhat tough in eating quality. Lowering of the protein content will make the cake more tender, but cakes made from mixes in which the protein of the flour has been eliminated will be so tender that they will not rise properly and will fall out of the pan on cooling. Accordingly, it may be desirable to add some starch to the flour to give optimum performance. A mixture containing 5% to 95% starch will give excellent results. The protein content of the mix can also be reduced by treatment of the flour to mechanically separate out a low protein fraction. Suitable mixes contain from about 15% to 30% farinaceous material, by weight.

Chemical leavening agents may be used in the "B" package to aid in producing a greater volume in the cakes. Such leavening agents including conventional gas-producing materials, such as sodium bicarbonate, combined with acid salts, such as monocalcium phosphate, sodium acid pyrophosphate, sodium aluminum sulfate, or combinations of these. About 0% to 1.0%, by weight of mix will provide excellent results.

It is to be understood that the foregoing listed components are intended to show typical formulations, and the invention is not to be limited thereby. Those skilled in the art will be able to select optimum combinations and amounts, as well as to make substitutions of ingredients without departing from the scope of the invention.

The following example illustrates the improvement obtained by adding various sizes of fine particles of normally solid fat to a two-stage angel food cake mix.

Example I

A basic angel food cake mix was prepared having the following composition:

|   | Ingredient | Amount (percent) |
| --- | --- | --- |
| "A" Package | Sugar | 38.0 |
|  | Dried Egg White | 10.4 |
|  | Cream of Tartar—Tartaric Acid | 0.6 |
|  | Salt | 0.2 |
|  | Flavoring | 0.3 |
| "B" Package | Sugar | 29.7 |
|  | Flour | 13.0 |
|  | Starch | 7.0 |
|  | Chemical Leavening | 0.7 |
|  | Flavoring | 0.1 |

Additional mixes were prepared each containing either .25% or 0.5% of hard fat differing in particle size. These particles were derived from refined and bleached cotton-seed oil which had been hydrogenated to an iodine value of about 8 and then had been hammermilled and separated into fractions of various particle sizes.

Cake batters were prepared by adding the contents of the "A" package to 1⅓ cups of water and mixing for 1 minute with an electric mixer at low speed. The mixer was then operated at high speed for about 3 minutes until the mixture formed stiff peaks. The mixer was then readjusted to low speed, and the contents of the "B" package were added gradually over a period of ½ minute. The mixing was continued for 1 minute. The batter was poured into a 10 inch x 4 inch tube pan and cut through once to remove air bubbles. It was then baked for about 40 minutes in an oven at a temperature of 375° F. The pan was removed from the oven, and inverted on a support for about 1 hour. The cakes were removed from the pans and the height was measured.

The following data were obtained using mixes containing only the indicated sizes of solid fat.

| Particle Size of Fractions (microns) | Cake Height (Inches) | |
| --- | --- | --- |
|  | 0.5% hard fat | 0.25% hard fat |
| Basic mix (no fat) | 4.20 | 4.20 |
| 295 microns and greater | 4.23 | 4.25 |
| 250–295 microns | 4.18 | 4.24 |
| 149–250 microns | 4.3 | 4.35 |
| 104–149 microns | 4.74 | 4.58 |
| 74–104 microns | 4.80 | 4.41 |
| 74 microns and less | 5.02 | 4.86 |

The above shows that particle sizes of not greater than about 150 microns produced a much larger cake.

The effect of using various particle sizes of solid fat is illustrated by the folowing data:

Example II

The same basic mix formulation was used as in Example I. Additional mixes were prepared by replacing a part of the sugar in the "B" package with a mixture of 90 parts of sugar and 10 parts of refined and bleached cotton seed oil hydrogenated to an iodine value of about 8. The hydrogenated cottonseed oil was flaked to a thickness of about 0.012 inch, combined with the sugar, and impact-ground in an apparatus of the type disclosed in U.S. Patent 2,339,737, hereinbefore referred to. It was estimated that about 75% of the fat was in the form of particles having a size not greater than about 150 microns.

The following cake heights were noted:

Percent of fat in mix:      Cake height (inches)
- Basic mix (no fat) _____ 3.9
- 0.1 _____ 4.0
- 0.2 _____ 4.1
- 0.3 _____ 4.3
- 0.4 _____ 4.5
- 0.5 _____ 4.6
- 0.6 _____ 4.7
- 0.7 _____ 4.9

As can be seen from the foregoing the addition of very small amounts of fat having a particle size not greater than about 150 microns resulted in an increase in cake height.

The following example illustrates the results obtained by the addition of various types of fats to angel food cake mixes.

Example III

The same basic cake mix and baking procedure were used as in Example I. Each of the additional mixes was prepared by adding 0.7% of the indicated solid fat ground as a 10% mixture with sugar as described in Example II. The following cake sizes were obtained:

Type of fat:      Height of cake (inches)
- Basic mix (control) _____ 4.18
- Cottonseed oil hydrogenated to I.V. 8 _____ 4.7
- Soybean oil hydrogenated to I.V. 8 _____ 4.75

Rapeseed oil hydrogenated to I.V. 8 _____ 4.8
Peanut oil hydrogenated to I.V. 8 _____ 4.95
Peanut oil hydrogenated to I.V. 45 [1] _____ 4.18
Palm kernel oil hydrogenated to I.V. 1 [1] ____ 3.94
Coconut oil hydrogenated to I.V. 1 [1] _____ 3.10

[1] These fats were soft at room temperature and all melted at a temperature less than 125°.

As can be seen, the addition of soft fats resulted in no improvement in cake size, and in several cases, caused a smaller cake.

It has also been found that the size of cakes made from commercially available two-stage mixes can be increased by means of the present invention.

*Example IV*

Samples of three widely-sold angel food mixes were purchased. Each of these mixes comprised two packets of ingredients which were to be combined in the conventional two-stage procedure. 0.7%, by total weight of mix, of hammer-milled hydrogenated cottonseed oil was added to the "B" package of a box of each of these mixes. 50% of these particles had a size not greater than 150 microns. Each mix was then used to make a cake, simultaneously making a cake from each of the as-purchased mixes. The following cake sizes resulted:

| Mix | Cake Height (Inches) | |
|---|---|---|
| | As Purchased | With Added Solid Fat |
| Mix A | 4.73 | 5.0 |
| Mix B | 4.78 | 5.17 |
| Mix C | 4.9 | 5.14 |

It was also noticed that the grain was more open in the cakes to which the solid fat had been added.

This invention is also applicable to so-called single stage mixes in which all ingredients are mixed with water at one time. The ingredients for these mixes are similar to those used in two-stage mixes. However, in mixes of this type it is usually advisable to reduce the protein content to a greater degree than in the two-stage mixes. Other adjustments in composition also may be advisable for maximum mix performance.

The following example illustrates the present invention in connection with a single-stage angel food cake mix.

*Example V*

The following were mixed together to form a basic single stage angel food cake mix:

| | Parts |
|---|---|
| Sucrose | 58.0 |
| Starch | 26.5 |
| Dried egg white | 10.9 |
| Flour | 2.1 |
| Dextrose | 1.0 |
| Leavening agents | 1.3 |
| Sodium desoxycholate | 0.2 |

Additional mixes were made, similar to the above mix, except that a part of the sugar was replaced with a ground mixture of 10% refined and bleached cottonseed oil hydrogenated to an iodine value of about 8 and 90% sucrose. The mixture was ground in an electric blender in admixture with Dry Ice to prevent melting. The mixture was ground until it could pass through a 60-mesh sieve (0.01 inch). A substantial part of the fat particles had a size not greater than about 150 microns. The heights of cakes baked with mixes containing indicated amounts of solid fat were as follows:

| Percent solid fat in mix: | Height of cake (inches) |
|---|---|
| Basic mix (control) | 3.98 |
| 0.1 | 4.10 |
| 0.5 | 4.6 |
| 1.0 | 4.7 |

As can be seen from the above examples, the addition of particles of normally solid fat to angel food cake mixes of various types will provide a substantial increase in the height of cakes prepared from these mixes.

What is claimed is:

1. A dry prepared angel food cake mix comprising farinaceous material, of which up to about 95% by weight is starch, said mix containing not less than 0.1% and not more than 5% by weight of mix of added particles of triglyceride fat having a melting point of not less than about 125° F., there being at least 0.05% by weight of mix of fat particles having a size not greater than about 150 microns.

2. A mix according to claim 1 wherein substantially all of the fat particles have a dimension not greater than about 0.015 inch.

3. A mix according to claim 1 wherein the normally solid triglyceride fat is hydrogenated soybean oil.

4. A mix according to claim 1 wherein the triglyceride fat is hydrogenated cottonseed oil.

5. A mix according to claim 1 wherein the triglyceride fat is hydrogenated peanut oil.

6. A mix according to claim 1 wherein the triglyceride fat is hydrogenated rapeseed oil.

7. A dry prepared angel food cake mix comprising egg white, sugar, and farinaceous material, up to about 95% by weight of said farinaceous material being starch, and containing additionally not less than 0.1% and not more than 5.0% by weight of mix of particles of triglyceride fat having a melting point of not less than about 125° F., there being at least 0.05% by weight of mix of fat particles having a size not greater than about 150 microns.

8. In a dry prepared angel food cake mix consisting of a first mixture comprising egg white, sugar, salt, and whipping aids and a second mixture comprising sugar, flour, starch, leavening agents and flavoring, said starch amounting up to about 95% by weight of the total of said starch and flour; the combination of said second mixture with not less than 0.1% and not more than 5% by weight of mix of particles of triglyceride fat having a melting point of not less than about 125° F., there being at least 0.05% by weight of mix of fat particles having a size not greater than about 150 microns.

9. A method of improving the volume of a cake made from a dry prepared angel food cake mix containing farinaceous material, of which up to about 95% by weight is starch, which comprises the steps of mixing together sugar and triglyceride fat having a melting point of not less than about 125° F., grinding said fat and sugar mixture until at least a portion of said fat is in the form of particles having a size not greater than about 150 microns, and thereafter adding said ground sugar and fat to said mix in an amount which provides not less than 0.1% and not more than 5.0% by weight of mix of particles of said fat, there being at least 0.05% by weight of mix of fat particles having a size not greater than about 150 microns.

References Cited in the file of this patent

UNITED STATES PATENTS

| 1,429,573 | Ellis | Sept. 19, 1922 |
| 2,463,870 | Hansen | Mar. 8, 1949 |
| 2,557,283 | Hansen | June 19, 1951 |
| 2,916,380 | Finucane et al. | Dec. 8, 1959 |